United States Patent [19]

Pawelzik et al.

[11] Patent Number: 4,501,408
[45] Date of Patent: Feb. 26, 1985

[54] VOLUME CONTROL VALVE

[75] Inventors: Manfred Pawelzik, Soest; Max Derr, Iserlohn, both of Fed. Rep. of Germany

[73] Assignee: Friedrich Grohe Armaturenfabrik GmbH & Co., Fed. Rep. of Germany

[21] Appl. No.: 394,699

[22] Filed: Jul. 2, 1982

[30] Foreign Application Priority Data

Jul. 14, 1981 [DE] Fed. Rep. of Germany ....... 3127714

[51] Int. Cl.³ .............................................. F16K 3/08
[52] U.S. Cl. ................................. 251/314; 137/625.46
[58] Field of Search ...................... 251/314, 317, 363; 137/625.41, 625.46, 625.15, 625.31

[56] References Cited

U.S. PATENT DOCUMENTS 880,127  2/1908  Cramer ........................... 137/625.31
3,566,909  3/1971  Scaramucci ....................... 251/317

Primary Examiner—Martin P. Schwadron
Assistant Examiner—James R. Shay
Attorney, Agent, or Firm—Donald J. Lenkszus

[57] ABSTRACT

A volume control valve in accordance with the invention is formed in a valve body which is adapted for insertion into a valve fitting. The valve body includes a valve seat insert and a valve disk. A sealing element is disposed between the valve seat insert and the valve fitting. The sealing element is carried on a supporting piece such that a first face of the sealing element is disposed on one side of the supporting piece and a second face is disposed on the other side of the supporting piece. The supporting piece is held against shoulders in the body such that the valve seat insert is prestressed by a predetermined amount by the first face. The second face is deformable against the fitting to accomodate different fitting depths.

6 Claims, 9 Drawing Figures

VOLUME CONTROL VALVE

BACKGROUND OF THE INVENTION

The invention relates to a volume control valve. Valves of this kind are well known, in which the external dimensions of such valves are chosen so that they can also be mounted in fittings which were originally designed for valve upper parts having an axially movable sealing cone. This results in extremely limited space for fitting the sealing disc and the seal between the fitting and the valve seat insert. In addition allowance has to be made for varying fitting depth tolerances of different fittings. Relatively complicated and expensive measures are therefore necessary in the case of the well known valves in order to achieve a sound seal of the valve insert with the supply inlet of the fitting.

SUMMARY OF THE INVENTION

The invention based on the problem of providing a volume control valve of the kind described above in which a seal between the valve seat insert and the inlet orifice is made possible by simple means, the valve seat insert being held so that it cannot rotate while at the same time the axial compression of the seal on the valve seat insert produced by the action of screwing is limited to a predetermined value.

A valve in accordance with the invention solves the above problem.

A volume control valve in accordance with the invention is formed in a valve body which is adapted for insertion into a valve fitting. The valve body includes a valve seat insert and a valve disk. A sealing element is disposed between the valve seat insert and the valve fitting. The sealing element is carried on a supporting piece such that a first face of the sealing element is disposed on one side of the supporting piece and a second face is disposed on the other side of the supporting piece. The supporting piece is held against shoulders in the body such that the valve seat insert is prestressed by a predetermined amount by the first face. The second face is deformable against the fitting to accomodate different fitting depths.

These measures cause the sealing element to be positioned between the valve seat insert and the fitting, the supporting piece ensuring that the valve seat insert is only subjected to a predetermined axial compressive force by mating with suitably designed contact surfaces while the opposite part of the sealing element which is in contact with the fitting can be compressed beyond the specified prestressing having regard to the individual fitting conditions. It is expedient for the supporting piece to be made circular and be provided with lugs which engage with the adjacent parts (body, valve seat insert) for accurate location and to hold the valve seat insert so as to prevent it from rotating.

In a further development of the invention, the compressive force of the valve seat insert can with advantage be limited by forming radially projecting lugs on the supporting piece which make contact with the base of suitably designed axial grooves in the body when the predetermined prestress is reached. It may also be an advantage for a circular face to be formed on the supporting piece instead of the lugs and which makes contact with a corresponding circular shoulder in the body when the predetermined stress is applied.

In a further development of the invention the supporting piece can also be designed as a snap ring which can be located in a radial groove in the body so that the valve component which is a loose fit in the body is always securely held in the operating position even in the dismantled condition.

It is expedient to join the supporting piece to the sealing element by vulcanising or even buttoning.

BRIEF DESCRIPTION OF THE DRAWINGS

The invention may be better understood from a reading of the following detailed description in conjunction with the drawings in which like references numbers refer to like elements and in which.

DETAILED DESCRIPTION

Figure 1:
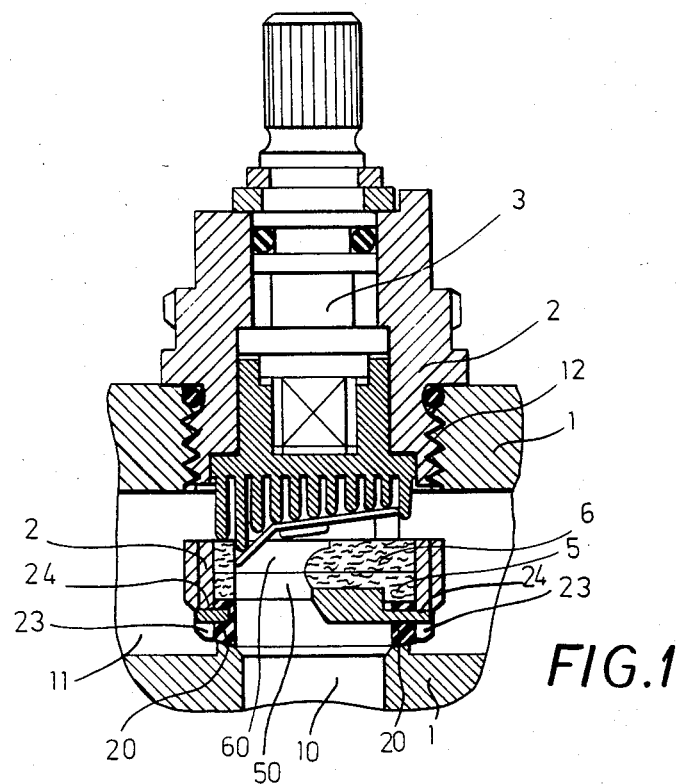
FIG. 1 is a volume control valve in longitudinal section mounted in a fitting.
Figure 2:
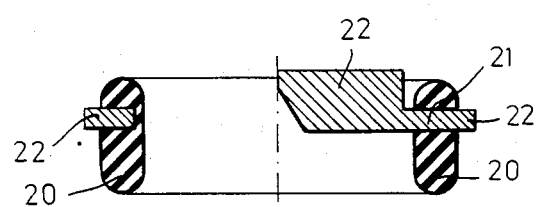
FIG. 2 shows the sealing element of FIG. 1 in longitudinal section drawn to a larger scale.
Figure 3:
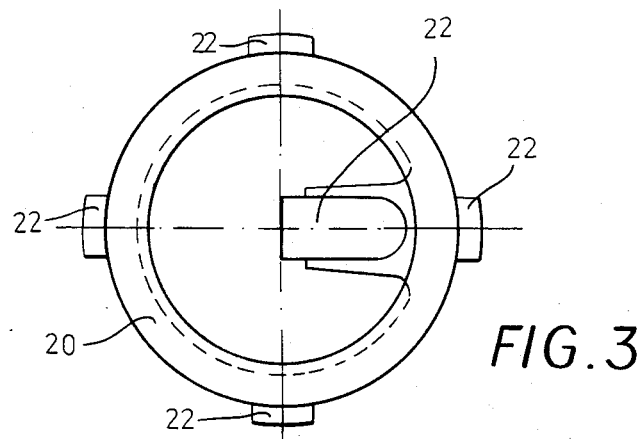
FIG. 3 is a plan view of the sealing element shown in FIG. 2.

In FIG. 1, the body 2 of the volume control valve is screwed tightly into a fitting 1 with a screw thread 12. A valve spindle 3 is supported coaxially and rotatably in the body 2 and has at its outer end a means of fitting a control grip for operating the valve. The inner end of the valve spindle 3 is connected positively to a turning member 4 which is supported axially in the body 2 in the direction of the valve spindle 3. Two valve inserts 5 are fitted to the turning member 4 transversely to the central axis. Each valve insert 5 has through orifices of 60, 50 respectively. The valve control insert 6 is connected nonrotatably to the immediately adjacent turning member 4, while the valve seat insert 5 is held non-rotatably in the body 2. A sealing element 20 is fitted between the upstream face of the valve seat insert 5 and the fitting 1 near to the inlet orifice 10 to seal the valve seat insert in the fitting 1.

The sealing element 20 is circular and made of resilient material, e.g. rubber. The periphery of the sealing element 20 is essentially radially surrounded by the upstream portion of the cylindrical hole for the acceptance of the valve inserts. A circular supporting piece 21 made of solid material is fitted to the sealing element 20 and divides the sealing element into two parts, one in contact with the valve seat insert and one with the fitting 1. Four radially projecting lugs 22 are symmetrically arranged on the supporting piece 21 and fit into corresponding axial grooves 23 in the upstream region of the body 2. In addition, the supporting piece 21 has one radially and one axially projecting lug 22 which engage with a corresponding slotted opening in the valve seat insert to form a positive means of preventing rotation between the body 2 and the valve seat insert 5. The axial lenghts of the axial grooves 23 are chosen so that when the predetermined prestressing is applied, the sealing element in the region of the valve seat insert is deformed to such an extent that the lugs 22 make contact with the base 24 of the axial grooves, which prevents any further increase of the compressive force of the two valve inserts.

These measures ensure that when screwing the valve core in the various fittings, the valve inserts are only subjected to a predetermined axial compression which is necessary for the sealing operation, while that part of the sealing element with an axially movable valve component which faces the fitting or the valve seat formed in the fitting may be stressed more highly depending on the tolerances of the fitting depth. In this way the two valve inserts are consistently easy to fit to the body 2 irrespective of the different fitting depths so that the volume of medium flowing from the inlet orifice 10 through the valve inserts can be controlled and delivered radially in the region of the turning component 4 to the discharge orifice 11 of the fitting 1.

Figure 4:
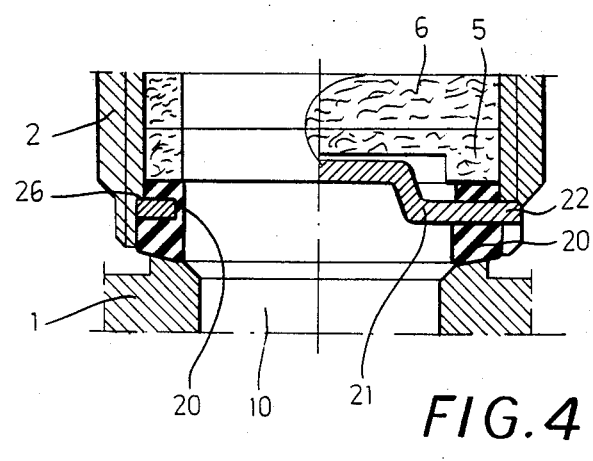
FIG. 4 is partial view of a volume control valve in longitudinal section.
Figure 5:
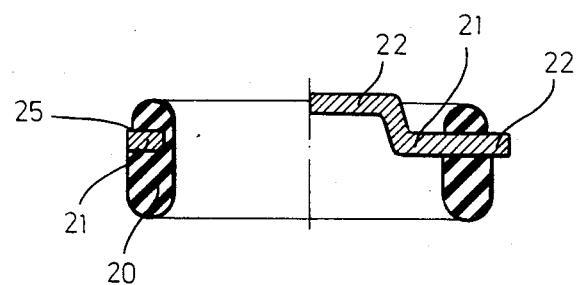
FIG. 5 is a longitudinal section of the sealing element shown in FIG. 4.
Figure 6:
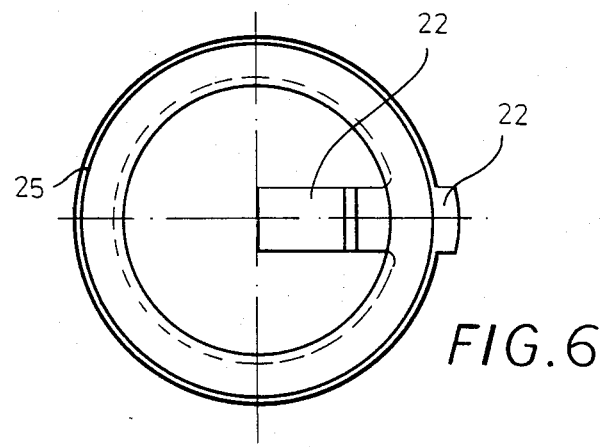
FIG. 6 a plan view of the sealing element shown in FIG. 5.

FIGS. 4 to 6 show a modified design of sealing element 20, in which the volume control valve may correspond to the design shown in FIG. 1. The supporting piece 21 is in the form of a closed ring into the downstream face of which the periphery of the sealing element 20 is sprung to form a circular face 25. A corresponding annular step-shaped shoulder 26 is formed in the bore. When the sealing element 20 is compressed with a predetermined compressive force the annular surface 25 makes contact, thereby preventing any further increase of the compressive force acting on the valve seat insert 5, while the upstream part of the sealing element 20 can be deformed to a greater extent. To secure the valve seat insert 5 from turning in the body 2, a radially projecting lug 22 is formed on the supporting piece 21 and, on the opposite side, a tongue-shaped lug 22, projecting axially into an offset, is formed, as can be seen from FIG. 6 in particular. The tongue-shaped lug 22 (see FIG. 4) then projects into a corresponding recess in the valve seat insert 5. The radially projecting lug 22 fits into an axial groove 23 to form a positive means of preventing the valve seat insert 5 from turning.

Figure 7:
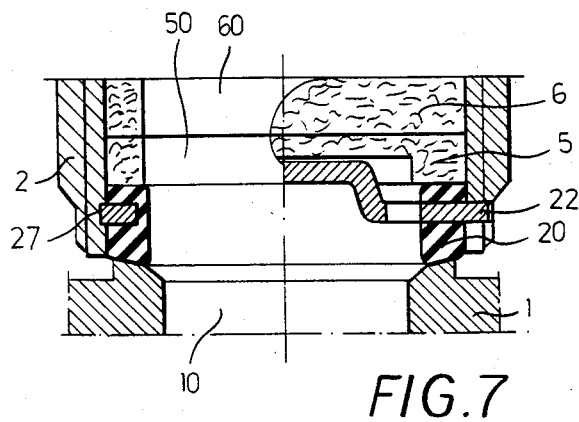
FIG. 7 is a partial view of a further volume control valve in longitudinal section.
Figure 8:
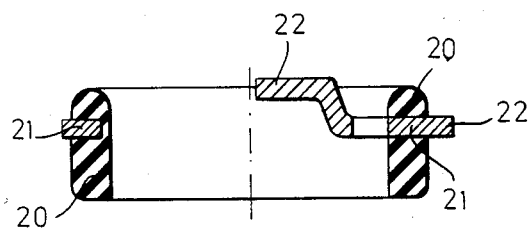
FIG. 8 is a longitudinal section of the sealing element shown in FIG. 7.
Figure 9:
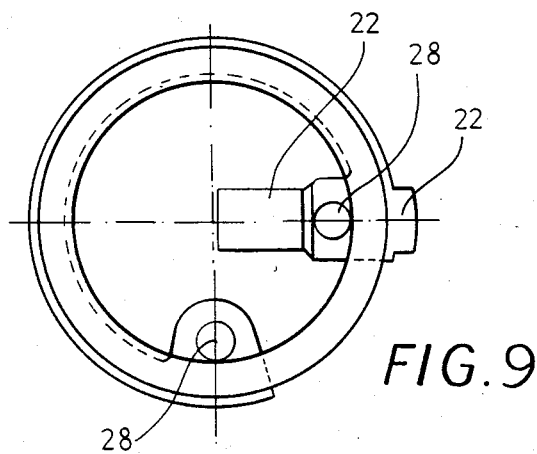
FIG. 9 is a plan view of the sealing element shown in FIG. 8.

A further modification of the sealing element 20 is shown in FIGS. 7 to 9. The supporting piece 21 is made in the form of a snap ring instead of a closed ring. In this case, the supporting piece 21 has an insignificantly enlarged diameter with respect to the diameter of the sealing element. A corresponding radial groove 27 is cut in the bore of the body 2. To enable the sealing element 20 to be easily fitted into the body 2, two eyelets 28 are provided on the supporting piece for a tool to insert the sealing element 20 in the bore of the body 2. By locating the supporting piece 21 in the radial groove 27 the required operating compression of the valve by the valve inserts is obtained. The upstream part of the sealing element 20 can in this way be deformed independently in accordance with the varying fitting depths.

In addition, due to the supporting piece 21 being designed as a snap ring, it is possible for the individual valve units to be mounted ready for operation in the body 2 irrespective of the fitting position. The method of preventing the valve seat insert 5 from turning is shown in the examples in FIGS. 4, 5, 6.

In the case of all three design examples, the supporting piece 21 can be joined to the sealing element 20 by buttoning or vulcanising.

What is claimed is:

1. A volume control valve for use in a sanitary fitting, having a first inlet orifice and a first outlet orifice said valve comprising:
    a valve body adapted for insertion into said fitting, said valve body having a axial inlet orifice and radial outlet orifices;
    a valve spindle rotatably mounted on said body;
    a valve seat insert disposed in said body and held in said body so as to be non-rotatable, said valve seat insert having at least one through opening transverse to the longitudinal axis of said body;
    a valve control disk rotatable on said valve seat insert by said spindle, said valve control disk having at least one through opening;
    a circular seal supporting piece having at least one lug engaging said body and one lug engaging said valve seat insert to prevent said valve seat insert from turning;
    a sealing element carried on said support piece, said sealing element having a first portion on one side of said support piece and a second portion on the other side of said support piece;
    said valve body including a shoulder;
    said supporting piece being adapted to engage said shoulder such that said first portion prestresses said valve seat disk by a predetermined amount;
    said second portion extending from said supporting piece toward said first inlet orifice and being deformable to sealing engage said fitting around said first inlet orifice.

2. A volume control valve in accordance with claim 1, wherein said supporting piece includes, a plurality of radially projecting lugs; said body comprising axial grooves for receiving said radially projecting lugs, said axial grooves being such that when said valve insert is prestressed by said predetermined amount, said lugs make contact with the base of the said axial grooves.

3. A volume control valve in accordance with claim 1, wherein a circular face of said supporting piece is pressed against said shoulder when the valve inserts are prestressed by said predetermined amount.

4. A volume control valve in accordance with claim 3, wherein said supporting piece is a snap ring, said shoulder being one wall of a radial groove in said body, said snap ring being disposed in said radial groove when said valve insert is prestressed by said predetermined amount.

5. A volume control valve in accordance with claim 4, wherein said sealing element is vulcanised to said supporting piece.

6. A volume control valve in accordance with claim 4, wherein said sealing element is buttoned to said supporting piece.

* * * * *